United States Patent [19]

Huang et al.

[11] Patent Number: 4,935,456

[45] Date of Patent: Jun. 19, 1990

[54] PROCESS FOR PREPARING MICROENCAPSULATED PARTICLES AND THE RESULTANT PRODUCTS AND USES THEREOF

[76] Inventors: Tsao-Chin C. Huang, 2316 Pendleton Dr., Monroeville, Pa. 15146; Mohamed S. El-Aasser, 2345 Edgewood Ave., Bethlehem, Pa. 18017; John W. Vanderhoff, 345 Ninth Ave., Bethlehem, Pa. 18018; Donna L. Visioli, 1738 Green Valley Rd., Havertown, Pa. 19083

[21] Appl. No.: 257,735

[22] Filed: Oct. 14, 1988

[51] Int. Cl.$^5$ ............................................. C08F 6/14
[52] U.S. Cl. ............................... 523/201; 524/801; 523/202; 523/336; 427/213.34; 264/4.7
[58] Field of Search ............... 523/201, 202, 215, 216, 523/217; 524/801; 264/4.7; 427/213.34

[56] References Cited

U.S. PATENT DOCUMENTS 3,884,871  5/1975  Herman et al. .................. 523/202
4,446,261  5/1984  Yamasaki et al. ................ 523/201

*Primary Examiner*—Joseph L. Schofer
*Assistant Examiner*—Jeffrey T. Smith
*Attorney, Agent, or Firm*—Samson B. Leavitt; Michael A. Leavitt

[57] ABSTRACT

A method comprising forming a water-in-oil emulsion of an aqueous phase comprising discrete water-insoluble particles an an aqueous solution of a water-soluble polymerizable monomer, polymerizing said monomer, phase-inverting the water-in-oil emulsion to an oil-in-water emulsion, removing the oil phase from the phase-inverted emulsion to form an aqueous latex, adding to the latex an ethylenically unsaturated polymerizable second monomer, and polymerizing said second monomer to produce hydrophobic resin-encapsulated water-insoluble particles; and the resulting encapsulated particles.

16 Claims, No Drawings

PROCESS FOR PREPARING MICROENCAPSULATED PARTICLES AND THE RESULTANT PRODUCTS AND USES THEREOF

This invention relates to the production of generally uniform-sized microparticles, and particularly to an encapsulation process to produce magnetic and/or pigmented latex particles and the resultant particles and the uses thereof.

BACKGROUND OF THE INVENTION

The use of pigmented or otherwise colored resin particles runs the gamut of literally thousands of different products in countless industries and uses. To mention but a few, we can point to pigmenting of synthetic resin fibers and films, and the coloring of plastic articles, literally by the tens of thousands.

The coloration of resin particles for use in the textile industry, in inks, various photographic applications, in the paper and pharmaceutical industry, in photocopying, magnetic tapes, medical diagnostic aids and tools is to mention but a few of the important uses of such particles.

Great effort, time, money and brain power have been expended to provide products whose requirements and characteristics are becoming more demanding and the uses more esoteric.

Since for many uses, phase stability of the final product is important if not critical (e.g. a paint pigment in a vehicle), in others uniformity of size and density, in still others the size per se, and, even further, the compatibility of the elements of the pigment particles, each on its own or any combination may and often is essential to optimization of the product for the intended use.

As discussed in U.S. Pat. No. 4,070,323 to Vanderhoff et al. (Jan. 24, 1978), the various techniques for producing polymer emulsions yield different particle sizes, thus:

1. direct emulsification of an organic solvent solution of the polymer in water using an oil-in-water type emulsifier to form droplets or particles of the polymer solution dispersed in water, after which the solvent may then be removed as by stripping or other method of removal. This method generally yields average polymer droplet sizes in the emulsion of about $1\mu$ (micron) or larger.

2. inversion emulsification of the polymer solution by adding water thereto in the presence of an oil-in-water emulsifier which can function at least partially effectively as a water-in-oil emulsifier so that an emulsion of water-in-polymer solution is initially formed which, upon further addition of water, inverts to form a polymer solution-in-water emulsion. This method, however, generally calls for greater care and control than method (1) and in addition yields average polymer droplet sizes in the emulsion of about $0.8–1.0\mu$ or larger.

3. emulsification by neutralization in which the polymer is prepared with functional acidic or basic groups and is emulsified in water by neutralizing these groups. Although this method can yield average polymer droplet sizes as small as $0.1\mu$, films cast from such emulsions are usually water-sensitive due to the significant proportions of functional acidic or basic groups in the polymer.

It is accordingly generally preferable to employ the above direct emulsification method (1). The five-fold difference in particle size between latexes prepared by this method (minimum $1\mu$) and latexes prepared by emulsion polymerization ($0.2\mu$) is however critical with respect to stability or resistance to settling or sedimentation. According to the Stoke's law, for spherical particles, $$\text{rate of sedimentation} = (D^2/18\eta)(d_p - d_m)g$$

where D is the particle diameter, $\eta$ the viscosity of the medium, $d_p$ and $d_m$ the densities of the particles and the medium, respectively, and g the gravitational constant.

The tendency for colloidal particles to settle upon standing is offset by their Brownian motion and the convection currents arising from small temperature gradients in the sample. The Brownian motion, which results from the unbalanced collisions of solvent molecules with the colloidal particles, increases in intensity with decreasing particle size. The convection currents depend upon the sample size and storage conditions. One criterion for settling is that a sedimentation rate of 1 mm. in 24 hours will be offset or nullified by the thermal convection currents and Brownian motion within the sample (Overbeek, in "Colloid Science, Vol. I", H. R. Kruyt, editor, Elsevier, Amsterdam, 1952, p. 80). Substituting this sedimentation rate in the above Stoke's equation enables determination of the largest particle size which, in any particular instance, will not settle out upon standing.

Thus, for polystyrene (density $d_p = 1.05$ gm/cm$^3$) dispersed in water (density $d_m = 1.00$, viscosity $n = 1$ cp), the largest particle size which will not settle on standing is $0.65\mu$. This calculated critical particle size is consistent with experimental observations that $1.0\mu$ diameter monodisperse polystyrene latex particles settle out on standing within 1–3 months, $0.8\mu$ diameter particles settle out within 3–6 months, and particles $0.5\mu$ or smaller never settle out at all. As a matter of fact, $1\mu$ diameter particles of most polymers, the minimum size generally produced by the direct emulsification method, settle at a relatively rapid rate which can be reduced by raising the viscosity of the water phase in some manner.

It is clear, therefore, that where optimum stability is required, it is necessary to utilize extremely small and uniform particles and where the particles are inorganic pigment and/or magnetic materials, and they are to be coated or encapsulated for use in the various areas described above, they must be extremely small, i.e. preferably below $0.5\mu$, especially since they require a coating and usually a hydrophobic coating for their end uses, such coating, obviously, adding to the particle diameter.

Many have attempted to encapsulate pigment and/or magnetic particles in a hydrophobic polymer shell, with varying degrees of success. Among the reasons for this lies the fact that pigment and or magnetic particles have a hydrophilic surface which does not form a good basis for the formation of a hydrophobic polymer shell.

The incompatibility problem is but one of many. Major difficulties have also been encountered with the complexity of the encapsulation process, the non-uniform particle size distribution, the heterogeneous and uneven distribution of core materials inside the individual capsules, and the uneven shaped pigment-polymer particles which result.

PRIOR ART

The preparation of polymer particles by various techniques including emulsion polymerization is well known. In the above described U.S. Pat. No. 4,070,323, the theory and background of particle size versus technique is fully discussed. In U.S. Pat. No. 4,487,855 colored latex products are prepared wherein the color is derived from organic color-forming groups which are chemically incorporated into the polymer moiety. In U.S. Pat. No. 4,644,030 we find described aqueous, polymer dispersions comprising a homogeneous molecular mixture of a polyurethane and polyacrylic material. Patently, colored or pigmented polymer are described in thousands, if not tens of thousands of U.S. patents but these are not germane to the present invention. U.S. Pat. No. 3,265,767 describes resin powders prepared via the emulsion polymerization route which are used as "pigments" or may be dyed or otherwise colored and used thusly as a pigment.

None of the mentioned prior art describes the encapsulation of a microscopic pigment particle in the manner of this invention as hereinafter described.

It is therefore an object of this invention to provide processes for preparing encapsulated microscopic particles and especially particles of substantially uniform size.

It is a further object of this invention to provide processes for preparing hydrophobically coated microscopic particles of substantially uniform size.

It is a still further object of this invention to provide a process for making uniform, microscopic, hydrophobic-resin-coated magnetic or pigment particles.

A still further object of this invention is to provide new and useful products derived from the processes of this invention and the uses of such products.

Other objects will appear hereinafter as the description proceeds.

GENERAL DESCRIPTION OF THE INVENTION

The foregoing and other objects are accomplished by providing a process whereby an aqueous sol or particle dispersion of high dispersibility and a water-soluble polymerizable monomer are dispersed in an oil phase to provide a water-in-oil emulsion of the monomer and particle of the sol or dispersion. A suitable wter-in-oil emulsifier (low HLB) is preferably used for this emulsification. Polymerization is effected using free radical forming conditions to form a polymer latex with the sol particle (e.g. inorganic oxide such as titanium dioxide or magnetite) encapsulated by the latex, with the oil phase being the continuous dispersion phase. It is preferred to use a cross-linking agent for the monomer (polymer) in the polymerization of the water soluble monomer to provide a hydrophilic shell (e.g. water-swellable), albeit a water-insoluble one. The resultant latex is then preferably phase-inverted into an aqueous (oil-in-water) latex, generally using a high HLB surfactant. The aqueous latex particles can then be used as seed particles to produce core-shell type aqueous hydrophobic pigment-latex particles.

DETAILED DESCRIPTION OF THE INVENTION

As described above the first step of the process of the present invention is to provide microscopic particles, generally less than several microns (e.g. 1, 2 or 3) in diameter and preferably less than 1 micron in diameter and more preferably less than about 0.5 microns for many specific end uses. A convenient source and form of the "microscopic" particles is, particularly in the case of inorganic particles for use as pigment core and/or magnetic core material, an inorganic oxide sol prepared, inter alia, by aqueous precipitation methods or by dispersion techniques from the finely divided powder. The following illustrates the preparation of a sol to be used in making magnetic latex particles.

ILLUSTRATION

Equimolar amounts of ferrous and ferric hydroxide are reacted in an aqueous, slightly alkaline medium at a temperature of from about 90° C. to 100° C. Specifically, for example, 216 g of ferrous sulfate heptahydrate and 11.2 g sodium perchlorate are dissolved in 1500 ml water-solution containing 22.2 ml of 96% concentrated sulfuric acid. With stirring, the system is heated up to 90° C. to complete the oxidation of the ferrous sulfate. To the system there are added an additional 108 g of the ferrous sulfate heptahydrate and 1 liter of aqueous sodium hydroxide containing 124 g NaOH, and the entire system is raised to the boil and held there for one hour.

For magnetic core material one may use any magnetic inorganic oxide such as magnetite, maghemite, and hematite; for pigments one may use akaganeite, delta hydrated ferric oxide and titanium dioxide.

The second phase of the process of this invention, after providing in one manner or another, the microparticle, is forming an inverse emulsion (water-in-oil) utilizing as the heterogeneous phase a water-soluble monomer component inside of which is the micro-particle. Generally a suitable (e.g. low HLB) emulsifier is indicated, and a water-insoluble liquid phase as the homogeneous phase.

Suitable monomers include acrylamide, methacrylamide, N-methylolacrylamide, sodium styrene sulfonate, vinyl pyrolidone, vinyl oxazolidinone, 2-acrylamido-2-methylpropane sulfonate and the like. The monomer concentration in the aqueous phase may range (by weight) from 0.5 to 50% or more, preferably about 1% to 30% and more preferably from about 1% to about 20%. The monomer, in addition to providing the initial encapsulating material, also enhances the formation and maintenance of the integrity of the microscopic particles and the aqueous hetero phase in fine, unaggregated form. The oil (water-insoluble liquid) may be any water-insoluble non-reactive liquid such as xylene, toluene and benzene, aliphatic hydrocarbons and the like. A preferred oil phase liquid is o-xylene.

The ratio of aqueous phase to oil phase may vary from 1 to 2:1, preferably 1:3 to 1:1 and most preferably 1:1, all on a volume basis.

As mentioned, an emulsifier is generally preferred and particularly a low HLB emulsifier.

Suitable but merely illustrative ones include Tetronic 1102 (BASF Wyandotte) which is a polyoxyethylene-polyoxypropylene-ethylene diamine adduct, Span 80 (ICI America) which is sorbitan mono-oleate, Pluronic L-92 and L-122 which are block copolymers of oxypropylene and oxyethylene units terminated with primary hydroxyl groups. These emulsifiers may be used in amounts ranging from about 0.5 to about 25%, preferably 1 to 20% and more preferably about 1.5 to about 18.2% by weight of the oil phase.

To effect polymerization, a free radical initiator is preferred. It may be water soluble (e.g. potassium persulfate) or oil-soluble such as 2,2'-azobis(2-methylbutyronitrile), 2,2'-azobis(2,4-dimethylvaleronitrile), and 2,2'-azobis(isobutyronitrile). The amount of initiator may vary from about 0.01% to about 1.0%, preferably 0.02% to about 0.2% and more preferably about 0.02% to about 0.05% (e.g. 0.045%), based on moles of monomer (i.e. mole %).

An additional and generally indicated ingredient in the water-soluble monomer polymerization stage is a water-soluble cross-linking agent such as N,N'-methylenebisacrylamide, hexamethoxymethylmelamine and the like. Such cross-linking agents are well known for cross-linking purposes, particularly to lessen the water-solubility or even render the product water-insoluble. In the present invention the water-soluble polymer is cross-linked to a water-insoluble form but is still hydrophilic (i.e. swellable as are numerous hydrogels). The cross-linking agents are advantageously used in amounts ranging from about 0.2 to about 25%, preferably 0.5 to about 20% and more preferably 1 to 15% (all by weight based on the monomer weight).

Temperatures of polymerization and/or cross-linking may vary from ambient (room) temperature e.g. 15° C. or 20° C. or 25° C. or 30° C. up to about 100° C. or even higher. Preferred temperatures range from about 40° C. to about 85° C. and more preferred from about 45° C. to 70° C. Within such advantageous temperatures, time of polymerization may vary from about 1 to 24 hours within which time period conversion is substantially complete depending on the monomer, etc. Typical reaction times are 1, 2, 3, 4, 10, 15, 17, 18 and 20 hours.

The water-insoluble inverse latex particle combination prepared as above is then phase inverted to an oil-in-water form by using a high HLB surfactant such as Triton X-100 (Rohm & Haas) an octylphenol-ethylene oxide (E.O) condensate (E.O content about 8 to 10, typically 9 or 10), Triton X-200 (Rohm & Haas) anionic-sodium alkyl aryl polyether sulfonate, Triton X-200 (Rohm & Haas), Triton X-301 (Rohm & Haas—sodium alkyl aryl ether sulfate), sodium diisobutyl sulfosuccinate and the like. The system may be further stabilized using Tamol 731-25 (Rohm & Haas—sodium salt of carboxylated polyelectrolyte) as illustrative of suitable, known dispersion stabilizers. The high HLB surfactant may be used in amounts from about 0.2 to about 5%, preferably 0.5 to 3% and more preferably 1 to 2% (typically-1.2, 1.4, 1.5%). The dispersant may be used in amounts ranging from about 0.2 to 5%, preferably about 0.5 to 3% and more preferably from 0.8 to 2% (typically 0.8, 1.0, 1.2, and 1.6%). To phase invert the latex the water-insoluble inverse latex is added to an aqueous solution of the high HLB surfactant and the dispersant while using emulsifying procedures (agitation, homogenizer etc.).

The original water-insoluble phase may now be stripped from the aqueous latex by azeotropic-distillation techniques.

As described, the aqueous dispersed resin-coated particles (latex) may be subjected to a second-stage emulsion polymerization procedure. In this stage of the process, the emulsion polymerization follows the homogeneous nucleation mechanism.

The nucleation of the monomer occurs by addition of radicals to monomer units in the aqueous continuous phase followed by precipitation of oligomeric chains through either self-nucleation or capture by colloidal particles already present or previously formed. In this process, the preexisting aqueous pigmental latex particles capture the oligomeric chains and form the core-shell type aqueous hydrophobic pigmental latex particles. The ethylenic unsaturated monomers used in this second-stage emulsion polymerization procedure include vinyl acetate, methyl methacrylate and styrene which are used advantageously in amounts ranging from about 0.2 to about 10% or more by weight of the whole emulsion, preferably about 0.5 to about 5% and more preferably 0.6 to 3.8%. The water-soluble free radical yielding initiator potassium persulfate or alternatively a redox catalyst composition including potassium persulfate and a reducing component sodium bisulfite is used advantageously in an amount of 20 mM based on the volume of the aqueous phase. Elevated reaction temperatures, advantageously between 55° C. and 75° C., are used to carry out the polymerization. A monomer-starved semicontinuous polymerization is run with the monomer addition rate ranging from 0.05 to 0.24 ml/min. The polymerization at the temperatures within the above range achieves substantially completed conversion in from 3 to 5 hours, depending upon the monomer.

The following examples will serve to illustrate the present invention without being deemed limitative thereof. Parts are by weight unless otherwise indicated.

EXAMPLE 1

Preparation of Water-Insoluble Inverse Magnetic Latex Particles

The following components are used as described

| Ingredient | Amount |
| --- | --- |
| 20 percent magnetite sol in water | 25 ml |
| 5 percent acrylamide solution in water | 50 ml |
| N,N'-methylenebisacrylamide | 7% based on acrylamide |
| o-xylene | 75 ml |
| Tetronic 1102 | 0.067 g per ml of o-xylene |
| 2,2'-azobis(2,4-dimethylvaleronitrile) | 0.045 mole % based on monomer |

The Tetronic 1102 emulsifier is dissolved in the o-xylene and the resulting solution is poured into a glass reactor. The emulsifier solution is heated to 70° C. The magnetite sol is added into the emulsifier solution. The N,N'-methylenebisacrylamide is dissolved in the acrylamide aqueous solution. The acrylamide solution is then added to the emulsion when the emulsion is cooled down to room temperature. The atmosphere of the reactor is flushed with high purity nitrogen. The 2,2'-azobis(2,4-dimethylvaleronitrile) is dissolved in o-xylene and added to the emulsion. The reaction mixture is heated for 2 hours at 45° C. in an end-over-end tumbling machine at 30 rpm. The resulting latex is a magnetic latex which is attracted by a magnet. A sample of polymeric composite is recovered by flocculating the particles with acetone, filtering and drying in air oven. The resulting film of dried particles is attracted by a magnet. The film is black in color and not soluble in water.

EXAMPLE 2

Preparation of Water-Insoluble Inverse Magnetic Latex Particles

| Ingredient | Amount |
| --- | --- |
| 15 percent magnetite sol in water | 25 ml |
| 20 percent acrylamide solution in water | 50 ml |

| Ingredient | Amount |
| --- | --- |
| N,N'-methylenebisacrylamide | 5% based on acrylamide |
| o-xylene | 75 ml |
| Span 80 | 0.12 g per ml of o-xylene |
| potassium persulfate | 0.030 mole % based on monomer |

The Span 80 emulsifier is dissolved in the o-xylene and the resulting solution is poured into a glass reactor. The N,N'-methylenebisacrylamide and potassium persulfate are dissolved in the acrylamide aqueous solution. The magnetite sol is added into the emulsifier solution. The acrylamide solution is then added into the emulsion. The atmosphere of the reactor is flushed with high purity nitrogen. The reaction mixture is heated for 2 hours at 45° C. in an end-over-end tumbling machine at 30 rpm. The resulting latex is a magnetic latex which is attracted by a magnet. A sample of polymeric composite is recovered by flocculating the particles with acetone, filtering and drying in an air oven. The resulting film is attracted by a magnet. The film is black in color and not soluble in water.

EXAMPLE 3

Preparation of Aqueous Magnetic Pigmental Latex Particles

| Ingredient | Amount |
| --- | --- |
| water-insoluble inverse magnetic latex | 150 ml |
| distilled-deionized water | 600 ml |
| Triton X-202 | 9 g |
| Tamol 731-25 | 12 g |

The Triton X-202 and Tamol 731-25 are dissolved in the water and the resulting solution is poured into a glass reactor. The water-insoluble inverse magnetic latex prepared in Example 2 is then added. The reaction mixture is agitated at 600 rpm for 1 hour. The resulting latex is subjected to azeotropic-distillation to strip off o-xylene. The resulting latex has a magnetic latex which is magnetic pigmental latex particles dispersed in the water dispersion medium.

EXAMPLE 4

Preparation of Aqueous Hydrophobic Magnetic Pigmental Latex Particles

| Ingredient | Amount |
| --- | --- |
| aqueous magnetic pigmental latex | 200 ml |
| vinyl acetate | 10 ml |
| potassium persulfate | 20 mM based on total volume |
| sodium bisulfite | 20 mM based on total volume |
| sodium bicarbonate | 20 mM based on total volume |
| distilled-deionized water | 50 ml |

The aqueous magnetic pigmental latex prepared as in Example 3 is buffered to pH 4.5 with formic acid and poured into a glass reactor. The latex is heated up to 75° C. and the reactor is flushed with high purity nitrogen. The potassium persulfate, sodium bisulfite and sodium bicarbonate are dissolved in the water and then added to the latex. The vinyl acetate is added slowly through an infusion pump at 0.15 ml/min addition rate. The reaction mixture is heated at 75° C. for 5 hours at 600 rpm agitation rate. The resulting latex is a magnetic latex which has hydrophobic magnetic pigmental latex particles dispersed in the water dispersion medium.

EXAMPLE 5

Preparation of Aqueous Hydrophobic Magnetic Pigmental Latex Particles

| Ingredient | Amount |
| --- | --- |
| aqueous magnetic pigmental latex | 200 ml |
| methyl methacrylate | 5 ml |
| potassium persulfate | 20 mM based on total volume |
| distilled-deionized water | 50 ml |

The aqueous magnetic pigmental latex prepared as in Example 3 is poured into a glass reactor and heated up to 55° C. The reactor is flushed with high purity nitrogen. The potassium persulfate is dissolved in the water and then added to the latex. The methyl methacrylate is added slowly through an infusion pump at 0.1 ml/min addition rate. The reaction mixture is heated at 55° C. for 3 hours at 800 rpm agitation rate. The resulting latex is a magnetic latex which has hydrophobic magnetic pigmental latex particles dispersed in the water dispersion medium.

EXAMPLE 6

Preparation of Aqueous Hydrophobic Magnetic Pigmental Latex Particles

| Ingredient | Amount |
| --- | --- |
| aqueous magnetic pigmental latex | 200 ml |
| styrene | 5 ml |
| potassium persulfate | 20 mM based on total volume |
| distilled-deionized water | 50 ml |

The aqueous magnetic pigmental latex prepared as in Example 3 is poured into a glass reactor and heated up to 70° C. The reactor is flushed with high purity nitrogen. The potassium persulfate is dissolved in the water and then added to the latex. The styrene is added slowly at 0.06 ml/min addition rate. The reaction mixture is heated at 70° C. for 4 hours at 800 rpm agitation rate. The resulting latex is a magnetic latex which has hydrophobic magnetic pigmental latex particles dispersed in the water dispersion medium.

EXAMPLE 7

Preparation of Water-Insoluble Inverse Magnetic Latex Particles

| Ingredient | Amount |
| --- | --- |
| 15 percent magnetite sol in water | 25 ml |
| 15 percent N-methylolacrylamide solution in water | 50 ml |
| hexamethoxymethylmelamine | 15% based on N-methylolacrylamide |
| o-xylene | 75 ml |
| Span 80 | 0.10 g per ml of o-xylene |
| 2,2'-azobis(isobutyronitrile) | 0.030 mole % based on monomer |
| aromatic sulfonic acid | 1% based on N-methylolacrylamide |

The Span 80 emulsifier is dissolved in the o-xylene and the resulting solution is poured into a glass reactor. The hexamethoxymethylmelamine and aromatic sulfonic acid are dissolved in the N-methylolacrylamide aqueous solution. The magnetite sol is added into the emulsifier solution. The N-methylolacrylamide solution is then added into the emulsion. The atmosphere of the reactor is flushed with high purity nitrogen. The 2,2'-azobis(isobutyronitrile) is dissolved in o-xylene and added to the emulsion. The reaction mixture is heated for 2 hours at 55° C. in an end-over-end tumbling machine at 30 rpm. The resulting latex is a magnetic latex which is attracted by a magnet.

EXAMPLE 8

Preparation of Water-Insoluble Inverse Magnetic Latex

| Ingredient | Amount |
|---|---|
| 6.3 percent magnetite sol in water | 30 ml |
| 16 percent methacrylamide solution in water | 45 ml |
| N,N'-methylenebisacrylamide | 4.2% based on methacrylamide |
| o-xylene | 75 ml |
| Tetronic 1102 | 0.067 g per ml of o-xylene |
| potassium persulfate | 0.12 mole % based on monomer |

The Tetronic 1102 emulsifier is dissolved in the o-xylene and the resulting solution is poured into a glass reactor. The emulsifier solution is heated up to 70° C. The magnetite sol is added into the emulsifier solution. The N,N'-methylenebisacrylamide and potassium persulfate are dissolved in the methacrylamide aqueous solution. The methacrylamide solution is then added to the emulsion when the emulsion has been cooled down to room temperature. The atmosphere of the reactor is flushed with high purity nitrogen. The reaction mixture is heated for 3 hours at 60° C. in an end-over-end tumbling machine at 30 rpm. The resulting latex is a magnetic latex which is attracted by a magnet.

EXAMPLE 9

Preparation of Water-Insoluble Inverse Magnetic Latex

| Ingredient | Amount |
|---|---|
| 6.3 percent magnetite sol in water | 30 ml |
| 15 percent sodium styrene sulfonate solution in water | 45 ml |
| N,N'-methylenebisacrylamide | 1.7% based on sodium styrene sulfonate |
| o-xylene | 75 ml |
| Tetronic 1102 | 0.067 g per ml of o-xylene |
| potassium persulfate | 0.14 mole % based on monomer |

The Tetronic 1102 emulsifier is dissolved in the o-xylene and the resulting solution is poured into a glass reactor. The emulsifier solution is heated up to 70° C. The magnetite sol is added into the emulsifier solution. The sodium styrene sulfonate aqueous solution is buffered to pH 7.3 with sodium hydroxide. The N,N'-methylenebisacrylamide and potassium persulfate are dissolved in the sodium styrene sulfonate solution. The sodium styrene sulfonate solution is then added to the emulsion when the emulsion has been cooled down to room temperature. The atmosphere of the reactor is flushed with high purity nitrogen. The reaction mixture is heated for 2 hours at 70° C. in an end-over-end tumbling machine at 30 rpm. The resulting latex is a magnetic latex which is attracted by a magnet.

EXAMPLE 10

Preparation of Water-Insoluble Inverse Magnetic Latex

| Ingredient | Amount |
|---|---|
| 6.3 percent magentite sol in water | 30 ml |
| 22.2 percent 2-acrylamido-2-methylpropane-sulfonate solution in water | 45 ml |
| N,N'-methylenebisacrylamide | 2% based on 2-acrylamido-2-methylpropane-sulfonate |
| o-xylene | 75 ml |
| Tetronic 1102 | 0.067 g per ml of o-xylene |
| potassium persulfate | 0.14 mole % based on monomer |

The Tetronic 1102 emulsifier is dissolved in the o-xylene and the resulting solution is poured into a glass reactor. The emulsifier solution is heated up to 70° C. The magnetite sol is added into the emulsifier solution. An aqueous sodium hydroxide solution is prepared and purged with compressed air. The 2-acrylamido-2-methylpropane-sulfonate is added slowly into the sodium hydroxide solution with stirring and purging with compressed air. The 2-acrylamido-2-methylpropane-sulfonate solution is kept at temperatures ranging between 25° and 40° C. and the solution is buffered to pH 7.0 with sodium hydroxide. The N,N'-methylenebisacrylamide and potassium persulfate are dissolved in the 2-acrylamido-2-methylpropane-sulfonate solution. The 2-acrylamido-2-methylpropane-sulfonate solution is then added to the emulsion when the emulsion has been cooled down to room temperature. The atmosphere of the reactor is flushed with high purity nitrogen. The reaction mixture is heated for 2 hours at 60° C. in an end-over-end tumbling machine at 30 rpm. The resulting latex is a magnetic latex which is attracted by a magnet.

EXAMPLE 11

Preparation of Water-Insoluble Inverse Pigmental Latex

| Ingredient | Amount |
|---|---|
| 6.3 percent inorganic sol in water | 30 ml |
| 22,2 percent acrylamide solution in water | 45 ml |
| N,N'-methylenebisacrylamide | 5% based on acrylamide |
| o-xylene | 75 ml |
| Tetronic 1102 | 0.067 g per ml of o-xylene |
| potassium persulfate | 0.030 mole % based on monomer |

The Tetronic 1102 emulsifier is dissolved in the o-xylene and the resulting solution is poured into a glass reactor. The emulsifier solution is heated up to 70° C. The inorganic oxides involved here are hematite, maghemite, akaganeite, delta hydrated ferric oxide and titanium dioxide. The iron oxide sols are prepared using the aqueous precipitation method and the titanium dioxide sol directly from dispersing the powder. The inorganic oxide sols are buffered with sulfuric acid or sodium hydroxide to the following pH values: 6.6 for hematite, 2.2 for maghemite, 4.3 for akaganeite, 5.4 for delta hydrated ferric oxide and 6.6 for titanium dioxide.

The inorganic oxide sol is then added into the emulsifier solution. The N,N'-methylenebisacrylamide and potassium persulfate are dissolved in the acrylamide aqueous solution. The acrylamide solution is then added to the emulsion when the emulsion has been cooled down to room temperature. The atmosphere of the reactor is flushed with high purity nitrogen. The reaction mixture is heated for 2 hours at 50° C. in an end-over-end tumbling machine at 30 rpm. The resulting latexes are water-insoluble inverse pigmental latex particles dispersed in the o-xylene dispersion medium. The latex which has inorganic oxide encapsulated inside the latex particles is a water-insoluble inverse magnetic pigmental latex and is attracted by a magnet.

EXAMPLE 12

Microencapsulation of Titanium Dioxide with Polyacrylamide Latex Particles

A first formula used to prepare the titanium dioxide-containing pigmental latex particles is shown in Table I.

TABLE I

| Ingredient | Amount |
| --- | --- |
| 5.1 percent titanium dioxide (A) sol in water | 30 ml |
| 22.2 percent acrylamide solution in water | 45 ml |
| N,N'-methylenebisacrylamide | 0.5 g |
| o-xylene | 75 ml |
| Tetronic 1102 | 6 g |
| potassium persulfate | 0.05 g |

The Tetronic 1102 emulsifier is dissolved in the o-xylene and the resulting solution is poured into a glass reactor. This emulsifier solution is heated up to 70° C. The titanium dioxide sol is added into the emulsifier solution. The N,N'-methylenebisacrylamide and initiator is added to the acrylamide aqueous solution. The acrylamide solution is then added to the emulsion when the emulsion is cooled down to room temperature. The reaction mixture is heated for 2 hours at 50° C. in an end-over-end tumbling machine at 30 rpm.

A second formula used for this microencapsulation is shown in Table II. The preparation of emulsion and the polymerization process are the same as above. The aqueous phase/oil phase ratio is less than that in Table I, i.e., 1:3 in this case instead of 1:1 of the first formula.

TABLE II

| Ingredient | Amount |
| --- | --- |
| 5.1 percent titanium dioxide sol in water | 10 ml |
| 22.2 percent acrylamide solution in water | 15 ml |
| N,N'-methylenebisacrylamide | 0.17 g |
| o-xylene | 75 ml |
| Tetronic 1102 | 2 g |
| potassium persulfate | 0.017 g |

The resulting titanium dioxide-containing pigmental latexes are subjected to azeotropic-distillation to strip off water which is contained in the latex particles. The distillation is carried out in a Buchner rotary-evaporator at 40° C. and 50–100 torr. For the first latex, the azeotropes are distilled out with periodic addition of o-xylene to the latex. For the second latex, the azeotropes are distilled out with periodic addition of both o-xylene and 1-butanol to the latex. The addition of 1-butanol is to help the extraction of water into the o-xylene phase. The distillations are monitored by measuring the volume of distillate, and are continued until all of the 1-butanol and most of the water are stripped off.

The resulting titanium dioxide-containing pigmental latexes are stable and the transmission electron microscopy shows that these latex particles have a different particle shape and particle morphology than the titanium dioxide particles.

We claim:

1. A method for preparing substantially uniform sized hydrophobic resin-coated water-insoluble microscopic particles having a size of no more than 3 microns which comprises:

A forming a water-in-oil emulsion of an aqueous phase comprising an aqueous solution of a water-soluble polymerizable monomer, said aqueous phase containing discrete water-insoluble particles, B polymerizing said water-soluble monomer to encapsulate said particles in said aqueous phase in a hydrophilic polymeric shell coating, C phase-inverting the water-in-oil emulsion from step B to an oil-in-water emulsion, D removing the heterogeneous oil phase from the resulting oil-in-water emulsion to form an aqueous latex containing said particles encapsulated in a hydrophilic polymeric shell coating, E adding to the latex from step D an ethylenically unsaturated second monomer polymerizable to a water-insoluble polymer, and F polymerizing said second monomer in the latex from step E to encapsulate the hydrophilic shell-coated water-insoluble particles with a hydrophobic polymeric shell coating.

2. A method as defined in claim 1 wherein the aqueous phase in step A includes a water-soluble or water-dispersible cross-linking agent for the said monomer.

3. A method as defined in claim 1 wherein a water-soluble low HLB emulsifier is used in step A during the formation of the water-in-oil emulsion.

4. A method as defined in claim 1 wherein the water-insoluble particles are inorganic magnetic particles.

5. A method as defined in claim 4 wherein the particles are included in Step A as an aqueous sol.

6. A method as defined in claim 5 wherein the average particle size of the sol particles ranges from about 0.1 to 1 micron.

7. A method as defined in claim 5 wherein the average sol particle size is about 0.65 microns or less.

8. A method as defined in claim 1 wherein the monomer concentration in the aqueous phase in Step A ranges from about 1% to 30% by weight.

9. A method as defined in claim 8 wherein the ratio of the aqueous phase to the oil phase in Step A ranges from about 1:5 to 2:1 on a volume basis.

10. A method as defined in claim 9 wherein from about 1 to 20% by weight based on the weight of the oil phase of a low HLB surfactant is used in the preparation of the water-in-oil emulsion in step A.

11. A method as defined in claim 10 wherein a free radical initiator is present during the water-soluble monomer polymerization in step B.

12. A method as defined in claim 11 wherein a water-soluble crosslinking agent is present in the aqueous phase during polymerization in step B.

13. A method as defined in claim 12 wherein in step B the amount of initiator ranges from about 0.01 to 1 mole % based on monomer present and the crosslinking agent from 0.5 to 20 weight % based on monomer.

14. A method as defined in claim 13 wherein the discrete water-insoluble particle is a magnetic particle.

15. A method as defined in claim 14 wherein the magnetic particle is magnetite.

16. A method as defined in claim 14 wherein the water-soluble monomer in step A is methacrylamide or acrylamide.

* * * * *